United States Patent
Zhang et al.

(10) Patent No.: US 12,166,559 B2
(45) Date of Patent: *Dec. 10, 2024

(54) SYSTEMS AND METHODS FOR BEAM FAILURE RECOVERY ENHANCEMENT

(71) Applicant: APPLE INC., Cupertino, CA (US)

(72) Inventors: Yushu Zhang, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Seyed Ali Akbar Fakoorian, San Diego, CA (US); Sigen Ye, San Diego, CA (US); Wei Zeng, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/593,294

(22) PCT Filed: Jun. 7, 2021

(86) PCT No.: PCT/CN2021/098626
§ 371 (c)(1),
(2) Date: Sep. 15, 2021

(87) PCT Pub. No.: WO2022/256967
PCT Pub. Date: Dec. 15, 2022

(65) Prior Publication Data
US 2024/0063877 A1   Feb. 22, 2024

(51) Int. Cl.
*H04B 7/06* (2006.01)
*H04B 17/318* (2015.01)
(Continued)

(52) U.S. Cl.
CPC ....... *H04B 7/06964* (2023.05); *H04B 7/0695* (2013.01); *H04B 17/328* (2023.05);
(Continued)

(58) Field of Classification Search
None
See application file for complete search history.

(56) References Cited

U.S. PATENT DOCUMENTS 11,843,559 B2 * 12/2023 Zhang ............... H04L 5/0032
2018/0263024 A1 * 9/2018 John Wilson ......... H04W 72/23
(Continued)

FOREIGN PATENT DOCUMENTS

CN          111869124 A      10/2020
WO          2020000308 A1    1/2020
WO          WO-2020113009 A1 *  6/2020 ........... H04B 7/0404

OTHER PUBLICATIONS

Mediatek Inc., "Remaining Issues on Beam Failure Recovery", R1-1801651, 3GPP TSG RAN WG1 Meeting #92, Athens, Greece, Agenda Item 7.1.2.2.4, Feb. 26-Mar. 2, 2018, 4 pages.
PCT/CN2021/098626, International Search Report and Written Opinion, Mar. 2, 2022, 9 pages.

*Primary Examiner* — Jay L Vogel
(74) *Attorney, Agent, or Firm* — Dorsey & Whitney LLP

(57) ABSTRACT

Systems and methods for beam failure recovery (BFR) are disclosed herein. A user equipment (UE) receives downlink (DL) reference signal(s) on corresponding beam(s) from a base station. The UE performs beam failure detection (BFD) on such beams used for user data to determine whether a beam failure has occurred, and candidate beam detection (CBD) on such beams not used for user data to identify candidate beams for recovering from the beam failure. The BFD and the CBD are based on both uplink (UL) channel performance considerations and DL channel performance considerations, as determined using the DL reference
(Continued)

signal(s), such that a beam failure may be determined in the UL, the DL, or both, and a candidate beam may be identified for UL, DL, or both. The UE sends a beam failure recovery request BFRQ with this information to the base station, and the system changes beams accordingly.

16 Claims, 7 Drawing Sheets

(51) Int. Cl.
*H04L 5/00* (2006.01)
*H04W 76/18* (2018.01)

(52) U.S. Cl.
CPC .......... *H04L 5/0048* (2013.01); *H04W 76/18* (2018.02); *H04L 5/001* (2013.01)

(56) References Cited

U.S. PATENT DOCUMENTS

| | | | |
|---|---|---|---|
| 2019/0052343 A1* | 2/2019 | Li | H04B 7/088 |
| 2019/0058519 A1* | 2/2019 | Davydov | H04W 72/21 |
| 2019/0306924 A1* | 10/2019 | Zhang | H04B 7/063 |
| 2020/0228183 A1* | 7/2020 | Venugopal | H04W 72/046 |
| 2020/0266876 A1* | 8/2020 | Yu | H04W 72/23 |
| 2021/0021325 A1* | 1/2021 | Davydov | H04W 24/10 |
| 2021/0152234 A1 | 5/2021 | Zhou et al. | |
| 2021/0320710 A1* | 10/2021 | Koskela | H04B 7/022 |
| 2022/0069884 A1* | 3/2022 | Zhang | H04W 76/11 |
| 2022/0302989 A1* | 9/2022 | Zhang | H04W 72/044 |
| 2022/0322113 A1* | 10/2022 | Zhang | H04W 76/18 |
| 2023/0362687 A1* | 11/2023 | Xu | H04W 24/08 |

\* cited by examiner

SYSTEMS AND METHODS FOR BEAM FAILURE RECOVERY ENHANCEMENT

TECHNICAL FIELD

This application relates generally to wireless communication systems, including methods and implementations of beam failure recovery mechanisms.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

It is contemplated that, when operating in a beamforming mode (e.g., an analog beamforming mode), one or more beam pairs between a UE and a base station may fail. This may occur due to a relocation of the UE and/or due to an obstruction between the UE and the base station (among other causes). Accordingly, a wireless communication system for the UE and the base station may support a beam failure recovery (BFR) mechanism to account for such beam failures.

Figure 1:
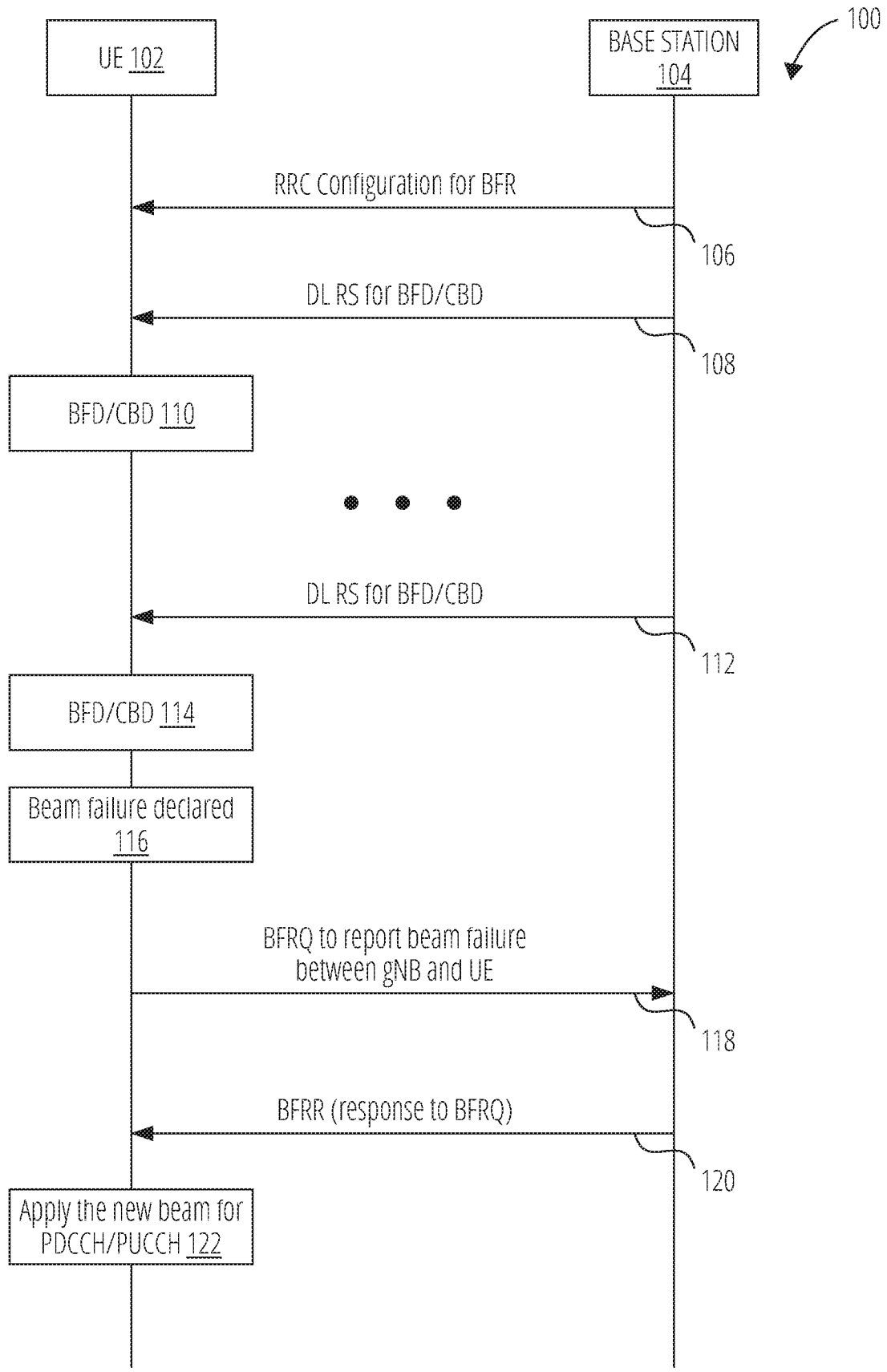
FIG. 1 illustrates a flow diagram of a beam failure recovery (BFR) mechanism performed between a UE and a base station, according to an embodiment.

FIG. 1 illustrates a flow diagram 100 of a BFR mechanism performed between a UE 102 and a base station 104, according to an embodiment. The base station 104 may provide an RRC configuration 106 for BFR to the UE 102. This RRC configuration 106 may inform the UE of downlink (DL) reference signals that may be used by the UE for beam failure detection (BFD) and/or of one or more DL reference signals that may be used by the UE for candidate beam detection (CBD) as part of the BFR mechanism.

Each of the DL reference signals used for either for BFD or for CBD may correspond to a transmission (Tx) beam used by the base station. Accordingly, it may be understood that the indication of a reference signal for use for BFD or CBD corresponds to an indication that the UE is to perform BFD/CBD (as appropriate) relative to the associated base station Tx beam. Examples of DL reference signals that may be used for this purpose include a channel state information reference signal (CSI-RS) and a synchronization signal/physical broadcast channel block (SS block or SSB).

It should be understood that when using beamforming methods, either/both of the UE and/or the base station may form a beam at that respective device (e.g., the base station may form a first beam of a beam pair between the UE and the base station, and the UE may form a second beam of the beam pair between the UE and the base station). As described herein, the purpose of a BFR mechanism may generally be to enable determinations relative to one or more base-station-formed/used beams. Accordingly, for simplicity, the use of "beam" or "beams" below may be generally understood to refer to a beam/beams that is/are formed/used by the base station (e.g., unless it is clear from context that some other type of beam is intended).

In the flow diagram 100, the base station 104 sends the DL reference signal(s) 108 for BFD/CBD to the UE 102. The DL reference signal(s) 108 are each sent on their respective beams. The UE 102 then uses these DL reference signal(s) 108 to perform the BFD/CBD 110.

The BFD may be performed on reference signals of beams which are currently used to communicate user data between the UE 102 and the base station 104. BFD at the UE 102 may be used to gauge a performance of a channel (for example, physicals downlink control channels (PDCCH)) that are on the same beams as (that are spatially quasi-colocated (QCLed) with) the reference signals used for BFD. When such a channel is QCLed with an indicated reference signal on a beam, the UE 102 uses a reference signal for the BFD on that beam to establish a performance of the channel on that beam. The UE may, for example, calculate a hypothetical block error ratio (BLER) for the PDCCH relative to a signal-to-interference and noise (SINR) ratio measured on the indicated reference signal on that beam and compare that value to a hypothetical BLER threshold (e.g., that was provided to the UE in the RRC configuration 106) to see if the value meets (or, in some embodiments, exceeds) the hypothetical BLER threshold.

CBD at the UE 102 is used to establish or determine a whether one or more beams that are available for use to communicate user data between the UE 102 and the base station 104 (but that are not currently being so used) would be appropriate for such a use. Beams so identified may be referred to herein as "candidate beams." In some cases, the CBD may be determined based on a layer 1 reference signal received power (L1-RSRP) value calculated relative to/using the indicated reference signal for each beam that is QCLed with the beam, and comparing this value to an L1-RSRP threshold (e.g., that was provided to the UE in the RRC configuration 106) to see if the value meets (or, in some embodiments, exceeds) the L1-RSRP threshold.

At the BFD/CBD 110, the UE 102 determines (according to the BFD) that, for at least one beam between the UE 102 and the base station 104, that the performance on, for example, a PDCCH on that beam is acceptable (e.g., by comparing the hypothetical BLER on, e.g., PDCCH of the beam to the relevant hypothetical BLER threshold). Accordingly, no beam failure is declared corresponding to the BFD/CBD 110.

To continuously monitor for a beam failure condition over a period of time, a BFR mechanism at the UE 102 may perform BFD/CBD at multiple instances in time (e.g., periodically). Accordingly, at a time later than the BFD/CBD 110, the base station 104 sends the DL reference signal(s) 112 for BFD/CBD to the UE 102. The DL reference signal(s) 112 are each sent on their respective beams. The UE 102 then uses these DL reference signal(s) 112 to perform the BFD/CBD 114.

At the BFD/CBD 110, the UE 102 determines (according to the BFD) that for no beam(s) between the UE 102 and the base station 104, the performance on, for example, a PDCCH on those beam(s) is acceptable (e.g., by comparing the hypothetical BLER on, e.g., the PDCCH of the beam(s) to the relevant hypothetical BLER threshold). Accordingly, the UE declares 116 a beam failure as between the UE 102 and the base station 104. It is also contemplated that, in some embodiments, the UE 102 may declare a beam failure when one or more (but not all) beams between the UE 102 and the base station 104 have unacceptable performance (e.g., a partial beam failure).

During the BFD/CBD 110, the UE 102 also determines one or more candidate beams.

The UE 102 then proceeds to prepare a beam failure recovery request (BFRQ) 118, and sends it to the base station 104. The BFRQ 118 may identify one or more of the candidate beams determined during the BFD/CBD 110. This may inform the base station 104 that the identified candidate beam(s) should be used for sending and receiving data as between the UE 102 and the base station 104.

The base station 104 replies to the BFRQ 118 with a beam failure recovery response (BFRR) 120. The BFRR may confirm to the UE 102 that the base station 104 received the BFRQ and has switched to the indicated candidate beam(s) in order to send and receive data between the UE 102 and the base station 104. A BFRR 120 may be sent on, for example, one or more PDCCH of the one or more of the candidate beam(s).

Once the UE receives the BFRR 120, the UE may apply 122 the candidate beam(s) for use for receiving PDCCH and for sending physical uplink control channel (PUCCH). This application 122 may take the form of the UE determining UE-formed/used beam(s) (each aligned to one of the corresponding candidate beam(s) of the base station) for use to send and receive data to and from the base station 104. The application 122 may occur after a number of symbols K after the receipt of the BFRR 120, such that there is time for the UE to decode the BFRR 120 prior to the time of the switch to the new beam(s) as between the UE 102 and the base station 104. In some embodiments, K may be 28, which may be consistent with a specification for the wireless communication system for the UE 102 and the base station 104. The UE may also update power control parameters for PUCCH as necessary.

In some wireless communication systems, a unified transmission configuration indicator (unified TCI) may be used. A unified TCI may be applied for both UL and DL channels across component carriers (CC) in a given band. A unified TCI may be updated by downlink control information (DCI) or by a medium access control control element (MAC CE). Any TCI update signaling may be accompanied by ACK/NACK signaling based on the old beam.

There may be multiple types of unified TCI. A first of the type of unified TCI is joint TCI, where one TCI is used/applied for both UL and DL channels between a UE and a base station. A second type of unified TCI is separate TCI, where an UL TCI is applied for uplink channels, and a DL TCI is applied for DL channels. The UL TCI and the DL TCI in these cases may be different.

It may be that some BFR mechanisms according to FIG. 1 may not account for, for example, UL channel performance in addition to DL channel performance. For example, as described in FIG. 1, the metric for beam failure detection may be based on DL hypothetical BLER. However, it can be possible that an UL channel sent on the beam provides very poor throughput while a DL channel (sent on the same beam as the UL channel) is still 'working' according to a check of DL hypothetical BLER.

It has accordingly been determined that additional BFR mechanisms that account for UL channel performance considerations (in addition to DL channel performance considerations) on a beam may be useful as part of a BFR mechanism. Accordingly, wireless communications systems described herein may perform BFD and/or CBD that are based on both UL channel performance and DL channel performance. This gives the BFR mechanism the flexibility needed perform BFR corresponding to a unified TCI use (e.g., when the wireless communication system is operating with a joint TCI mode or a separate TCI mode).

In some cases, BFD and/or CBD of a BFR mechanism may be enhanced to consider different thresholds for UL and DL, respectively. Further, a BFRQ of the BFR mechanism may be enhanced to report one of an UL beam failure, a DL beam failure, or both a beam failure for both UL and DL, in the manner to be shown. Finally, a UE using such a BFR mechanism may apply a newly identified beam for one of UL or DL, or for both UL and DL.

Figure 2:
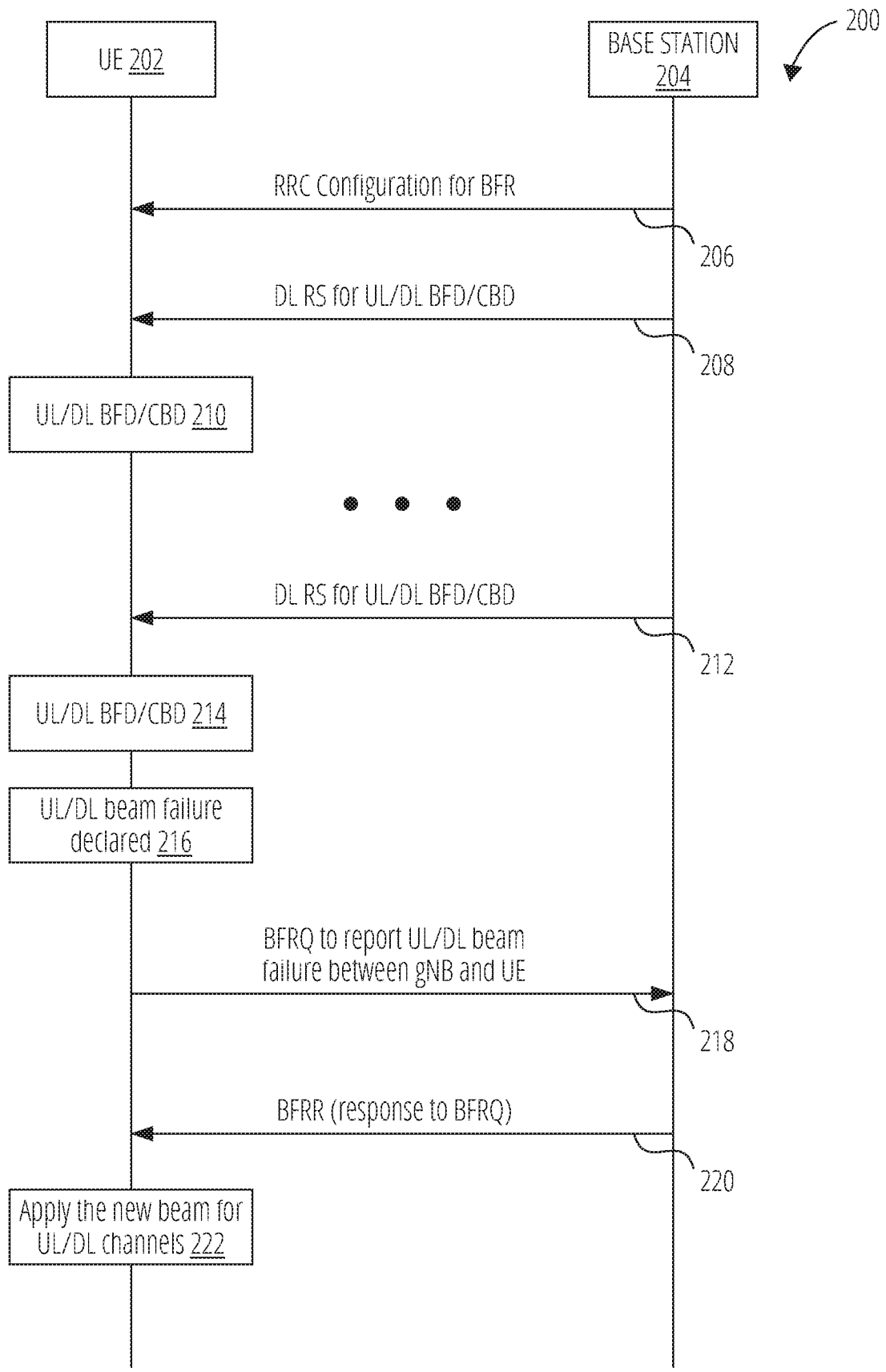
FIG. 2 illustrates a flow diagram of a BFR mechanism performed between a UE and a base station and that is based on DL channel performance and UL channel performance, according to an embodiment.

FIG. 2 illustrates a flow diagram 200 of a BFR mechanism performed between a UE 202 and a base station 204 and that is based on DL channel performance and UL channel performance, according to an embodiment. The base station 104 may provide an RRC configuration 206 for BFR to the UE 202. This RRC configuration 206 may inform the UE of DL reference signals that may be used by the UE for BFD and/or one or more DL reference signals that may be used by the UE for CBD. As before, each of the indicated DL reference signals used for either BFD or CBD may correspond to a respective beam (e.g., be spatially QCLed with a channel such as a PDCCH on the respective beam).

The base station 204 then sends the DL reference signal(s) 208 for UL/DL BFD/CBD to the UE 102. The DL reference signal(s) 208 are each sent on their respective beams. The UE 202 then uses the DL reference signal(s) 208 to perform the UL/DL BFD/CBD 210.

The UL/DL BFD/CBD 210 may comprise a UL/DL BFD that may be performed using reference signals of beams which are currently used to communicate data between the UE 202 and the base station 204. This UL/DL BFD may be based on an UL channel performance and a DL channel performance (e.g., based on UL channel performance considerations and DL channel performance considerations). To reach the UL channel performance considerations (in addition to any DL channel performance considerations), the UL/DL BFD may be performed using thresholds that account for such UL channel performance considerations. For example, a UL/DL BFD performed based on L1-RSRP threshold(s) and/or virtual PHR threshold(s) that may effectively reflect an UL link budget in ways that other metrics may not. In the case of L1-RSRP, the received power may reflect UL performance considerations. In the case of a virtual PHR, a pathloss value used as part of the virtual PHR calculation may reflect UL performance considerations.

In a first set of embodiments of UL/DL BFD use, a UL/DL BFD may be performed using (at least) one threshold of a type that takes into account UL channel aspects, such that a beam failure (for both UL and DL) can be declared with respect to (at least in part) the UL channel performance as gauged using the threshold. It may further be that in some of these embodiments, multiple types of thresholds may be checked against the reference signal(s) of the beam(s) used for UL/DL BFD, and one or more of these multiple thresholds may account for the UL channel performance aspects in this manner (where it should also be understood that the use of the multiple thresholds also covers the DL considerations). This type of UL/DL BFD may be used in cases where it is desired to enable UL channel performance considerations to cause a determination of whether a beam failure (for both UL and DL) should be declared.

As a first example of such first set of embodiments of a UL/DL BFD, measured L1-RSRP values of the reference signal(s) on the beam(s) used for the UL/DL BFD may be compared to an L1-RSRP threshold. In this case, if each reference signal so measured fails to exceed (or, in other embodiments, fails to meet or exceed) the L1-RSRP threshold, then a beam failure (for both UL and DL) is declared. Partial beam failures (e.g., where some, but not all, of the reference signals so measured meet the beam failure conditions), may also invoke a beam failure declaration by the UE 202 in some embodiments according to this first example.

As a second example of such first set of embodiments of a UL/DL BFD, measured L1-RSRP values of the reference signal(s) on the beam(s) used for the UL/DL BFD may be compared to an L1-RSRP threshold, and hypothetical BLER measured (in the manner discussed above) respective to the reference signal(s) on the beam(s) used for the UL/DL BFD may be compared to a hypothetical BLER threshold. In some of these cases, if each reference signal so measured for L1-RSRP fails to exceed (or, in other embodiments, fails to meet or exceed) the L1-RSRP threshold, and if the hypothetical BLER measured respective to each such reference signal exceeds (or meets or exceeds) the hypothetical BLER threshold, then a beam failure (for both UL and DL) is declared. In others of these cases, if one or the other of these event occurs, then a beam failure (for both UL and DL) is declared. In these cases, the L1-RSRP threshold and the hypothetical BLER threshold can be configured by RRC (e.g., the RRC configuration 206). Partial beam failures (e.g., where some, but not all, of the reference signals so measured meet the beam failure conditions), may also invoke a beam failure declaration by the UE 202 in some embodiments according to this second example.

As a third example of such first set of embodiments of a UL/DL BFD, virtual power headroom (PHR) calculated respective to the reference signal(s) on the beam(s) used for the UL/DL BFD may be compared to a virtual PHR threshold, and hypothetical BLER measured respective to the reference signal(s) on the beam(s) used for the UL/DL BFD may be compared to a hypothetical BLER threshold. In some of these cases, if the virtual PHR measured respective to each such reference signal is below (or, in other embodiments, is at or below) the virtual PHR threshold, and if the hypothetical BLER measured respective to each such reference signal exceeds (or meets or exceeds) the hypothetical BLER threshold, then a beam failure (for both UL and DL) is declared. In others of these cases, if one or the other of these events occurs, then a beam failure (for both UL and DL) is declared. In these cases, the virtual PHR threshold and the hypothetical BLER threshold can be configured by RRC (e.g., the RRC configuration 206). Virtual PHR in these cases may be measured based on power control parameters applied in joint or separate TCI used for current UL channels. The pathloss values used for the virtual PHR calculation may themselves be calculated based on either an L1-RSRP or a layer 3 reference signal received power (L3-RSRP) of the reference signal(s) on the beam(s) used for the UL/DL BFD. Partial beam failures (e.g., where some, but not all, of the reference signals so measured meet the beam failure conditions), may also invoke a beam failure declaration by the UE 202 in some embodiments according to this third example.

In a second set of embodiments of UL/DL BFD use, a UL/DL BFD may be performed using the beams of the UL/DL BFD such that a DL BFD and UL BFD can be (separately) analyzed for/declared. In other words, the UE may use an UL BFD to determine whether an UL beam failure should be declared, and, may further (separately) use a DL BFD to determine whether a DL beam failure should be declared. In these instances, there may be a first threshold used for the UL BFD and a second threshold used for the DL BFD. In some cases, the first and second thresholds may be of the same type, but of different values. In other contemplated cases, the first and second thresholds may be of different types. This type of UL/DL BFD may be used in cases where it is desired that the UL channel performance considerations are handled by making any UL beam failure declaration (based on the first threshold) separately from any DL beam failure declarations driven by DL channel performance considerations (e.g., as analyzed using the second threshold). This may allow the system to continue to use beams that have failed on (only) one of the UL and DL for communications in the opposite (non-failed) direction. For example, when (only) an UL beam failure is declared for a beam, it may be understood that that beam may still be used for DL communication going forward (and vice-versa), allowing for a granular control of, and an efficient use of, beams throughout the wireless communication system.

As a first example of such second set of embodiments of a UL/DL BFD, to perform UL BFD, measured L1-RSRP values of the reference signal(s) on the beam(s) used for the UL/DL BFD may be compared to a first L1-RSRP threshold. Then, if each reference signal so measured fails to exceed (or, in other embodiments, fails to meet or exceed) the first L1-RSRP threshold, a UL beam failure is declared. Further, to perform DL BFD, the measured L1-RSRP values of the reference signal(s) on the beam(s) used for the UL/DL BFD may be compared to a second L1-RSRP threshold. Then, if each reference signal so measured fails to exceed (or, in other embodiments, fails to meet or exceed) the second L1-RSRP threshold, a DL beam failure is declared. Partial UL beam failures (e.g., where some, but not all, of the reference signals so measured meet UL beam failure conditions) and/or partial DL beam failures (e.g., where some, but not all, of the reference signals so measured meet DL beam failure conditions) may also invoke corresponding beam failure declaration(s) on UL and/or DL by the UE 202 in some embodiments according to this first example.

As a second example of such second set of embodiments of a UL/DL BFD, to perform UL BFD, measured L1-RSRP values of the reference signal(s) on the beam(s) used for the UL/DL BFD may be compared to an L1-RSRP threshold. Then, if each reference signal so measured fails to exceed (or, in other embodiments, fails to meet or exceed) the L1-RSRP threshold, an UL beam failure is declared. Further, to perform DL BFD, hypothetical BLER measured respective to the reference signal(s) on the beam(s) used for the UL/DL BFD may be compared to a hypothetical BLER threshold. Then, if the hypothetical BLER measured respective to each such reference signal exceeds (or meets or exceeds) the hypothetical BLER threshold, a DL beam failure is declared. In these cases, the L1-RSRP threshold and the hypothetical BLER threshold can be configured by RRC (e.g., the RRC configuration 206). Partial UL beam failures (e.g., where some, but not all, of the reference signals so measured meet UL beam failure conditions) and/or partial DL beam failures (e.g., where some, but not all, of the reference signals so measured meet DL beam failure conditions) may also invoke corresponding beam failure declaration(s) on UL and/or DL by the UE in some embodiments according to this second example.

As a third example of such second set of embodiments of a UL/DL BFD, to perform UL BFD, virtual PHR calculated respective to the reference signal(s) on the beam(s) used for the UL/DL BFD may be compared to a virtual PHR threshold. Then, if the virtual PHR measured respective to each such reference signal is below (or, in other embodiments, is at or below) the virtual PHR threshold, an UL beam failure is declared. Further, to perform DL BFD, hypothetical BLER measured respective to the reference signal(s) on the beam(s) used for the UL/DL BFD may be compared to a hypothetical BLER threshold. Then, if the hypothetical BLER measured respective to each such reference signal exceeds (or meets or exceeds) the hypothetical BLER threshold, a DL beam failure is declared. In these cases, the virtual PHR threshold and the hypothetical BLER threshold can be configured by RRC (e.g., the RRC configuration 206). Virtual PHR in these cases may be measured based on power control parameters applied in joint or separate TCI used for current UL channels. The pathloss values used for the virtual PHR calculation may themselves be calculated based on either an L1-RSRP or an L3-RSRP of the reference signal(s) on the beam(s) used for the UL/DL BFD. Partial UL beam failures (e.g., where some, but not all, of the reference signals so measured meet UL beam failure conditions) and/or partial DL beam failures (e.g., where some, but not all, of the reference signals so measured meet DL beam failure conditions) may also invoke corresponding beam failure declaration(s) on UL and/or DL in some embodiments according to this third example.

The UL/DL BFD/CBD 210 may further comprise a UL/DL CBD that may be performed using reference signals of beams which are not currently used to communicate data between the UE 202 and the base station 204, but which are available for that purpose. This UL/DL CBD may be based on an UL channel performance and a DL channel performance.

In a first set of embodiments of UL/DL CBD use, a UL/DL CBD may be performed using (at least) one threshold of a type that takes into account UL channel aspects, such that a candidate beam can be identified with respect to (at least in part) UL channel performance of the candidate beam as gauged using the threshold. This type of UL/DL CBD may be used in cases where it is desired that UL channel performance considerations may cause a determination of whether a beam is a candidate beam for both UL and DL.

As a first example of such first set of embodiments of a UL/DL CBD, measured L1-RSRP values of the reference signal(s) on the beam(s) used for the UL/DL CBD may be compared to an L1-RSRP threshold. In this case, if a reference signal so measured exceeds (or, in other embodiments, meets or exceeds) the L1-RSRP threshold, then its corresponding beam is identified as a candidate beam for both UL and DL.

In a second set of embodiments of UL/DL CBD use, a UL/DL CBD may be performed using the beams of the UL/DL CBD such that a UL CBD and DL CBD can be (separately) performed. In other words, the UE may use a UL CBD to determine whether a beam is appropriate to use for UL data communications (e.g., an UL candidate beam), and, may further (separately) use a DL CBD to determine whether a beam appropriate to use for DL communications (e.g., a DL candidate beam). In these instances, there may be a first threshold used for the UL CBD and a second threshold used for the DL CBD. In some cases, the first and second thresholds may be of the same type, but of different values. In other contemplated cases, the first and second thresholds may be of different types. This type of UL/DL CBD may be used in cases where it is desired that the UL channel performance considerations are handled by making any UL candidate beam determinations (based on the first threshold) separately from any DL candidate beam determinations driven by DL channel performance considerations (e.g., as analyzed using the second threshold). For example, when a beam satisfies the test for (only one of) being a DL candidate beam or an UL candidate beam, it may be understood that that beam may be used going forward in the corresponding direction, which allows for a granular control of, and an efficient use of, beams throughout the wireless communication system.

As a first example of such second set of embodiments of a UL/DL CBD, to perform UL CBD, measured L1-RSRP values of the reference signal(s) on the beam(s) used for the UL/DL CBD may be compared to a first L1-RSRP threshold. If a reference signal so measured exceeds (or, in other embodiments, meets or exceeds) the first L1-RSRP threshold, then its corresponding beam is identified as an UL candidate beam. Further, to perform DL CBD, the measured L1-RSRP values of the reference signal(s) on the beam(s) used for the UL/DL CBD may be compared to a second L1-RSRP threshold. If a reference signal so measured exceeds (or, in other embodiments, meets or exceeds) the second L1-RSRP threshold, its corresponding beam is identified as a DL candidate beam.

As a second example of such second set of embodiments of a UL/DL CBD, to perform UL CBD, virtual PHR calculated respective to the reference signal(s) on the beam(s) used for the UL/DL CBD may be compared to a virtual PHR threshold. If a virtual PHR measured respective to a reference signal exceeds (or, in other embodiments, meets or exceeds) the virtual PHR threshold, then the beam corresponding to that reference signal is identified as a UL candidate beam. Further, to perform DL CBD, measured L1-RSRP values of the reference signal(s) on the beam(s) used for the UL/DL CBD may be compared to an L1-RSRP threshold. If a reference signal so measured exceeds (or, in other embodiments, meets or exceeds) the L1-RSRP threshold, its corresponding beam is identified as a DL candidate beam. Virtual PHR in these cases may be measured based on power control parameters applied in joint or separate TCI used for current UL channels. The pathloss values used for the virtual PHR calculation may themselves be calculated based on either an L1-RSRP or an L3-RSRP of the reference signal(s) on the beam(s) used for the UL/DL CBD.

It is also contemplated that, when performing UL/DL CBD that uses separate thresholds for UL and DL, a beam that satisfies both thresholds may be identified and/or used as described herein as any of an UL candidate beam, a DL candidate beam, or a candidate beam for both UL and DL.

At the UL/DL BFD/CBD 210, the UE 202 determines (e.g., according to one of the examples of UL/DL BFD above) that no beam failure (whether it be a beam failure for both UL and DL, an UL beam failure, or a DL beam failure, as applicable for the used example) has occurred. Accordingly, no beam failure is declared corresponding to the UL/DL BFD/CBD 210.

To monitor for a beam failure condition over a period of time, a BFR mechanism at the UE 202 may perform UL/DL BFD/CBD at multiple instances in time (e.g., periodically). Accordingly, at a time later than the UL/DL BFD/CBD 210, the base station 204 sends the DL reference signal(s) 212 for UL/DL BFD/CBD to the UE 202. The DL reference signal(s) 212 are each sent on their respective beams. The UE 202 then uses these DL reference signal(s) 212 to perform the UL/DL BFD/CBD 214.

At the UL/DL BFD/CBD 214, the UE 202 uses one of the UL/DL BFD methodologies described above to determine that an UL beam failure, a DL beam failure, or an UL and DL beam failure has occurred. Accordingly, the UE 202 declares 216 the determined beam failure as between the UE 202 and the base station 204.

During the UL/DL BFD/CBD 210, the UE 202 also determines one or more candidate beams (e.g., one or more UL candidate beams, one or more DL candidate beams, and/or one or more candidate beams for UL and DL) using one of the methodologies for UL/DL CBD described above.

The UE 202 then proceeds to prepare and send a BFRQ 218 to the base station 204. The BFRQ 218 may identify one or more of the candidate beams determined during the UL/DL BFD/CBD 210. This may inform the base station 204 that the identified candidate beam(s) should be used for sending and receiving data as between the UE 202 and the base station 204. Further, the BFRQ 218 may identify candidate beams according to UL and/or DL usages. In other words, for each identified candidate beam, the BFRQ 218 may indicate or otherwise reflect whether that beam is an UL candidate beam, a DL candidate beam, or a candidate beam for both UL and DL. The base station 204 may infer the nature of the beam failure based on the type of candidate beams identified. For example, the base station 204 may infer that an UL beam failure has occurred based on a BFRQ that identifies UL candidate beam(s), that a DL beam failure has occurred based on a BFRQ that identifies DL candidate beam(s), or that a beam failure for both UL and DL has occurred based on a BFRQ that identifies candidate beams for both UL and DL (or that (separately) identifies both UL candidate beam(s) and DL candidate beam(s)).

A first set of embodiments of such BFRQ may use contention free physical random access channel (CF-PRACH) resources to identify one or more candidate beams. These CF-PRACH resources may be configured by the base station using RRC (e.g., during the RRC configuration 206). The base station may configure each of these CF-PRACH resource with one of 'uplink-beamFailureRecovery,' corresponding to a use of that CF-PRACH resource to identify UL candidate beams to the base station; 'downlink-beamFailureRecovery,' corresponding to a use of that CF-PRACH resource to identify DL candidate beams to the base station; or 'both,' corresponding to a use of that CF-PRACH resource to identify candidate beams for both UL and DL to the base station. Then, when the UE sends a BFRQ that identifies one or more candidate beams to the base station, the identification of each candidate beam can be sent in a CF-PRACH resource that corresponds to the appropriate use of the candidate beam as one of a UL candidate beam (in which case the identification is sent in a 'uplink-beamFailureRecovery' CF-PRACH resource), a DL candidate beam (in which case the identification is sent in a 'downlink-beamFailureRecovery' CF-PRACH resource), or as a candidate beam for both UL and DL (in which case the identification is sent in a 'both' CF-PRACH resource).

A second set of embodiments of such BFRQ may use MAC CE resources to identify one or more candidate beams. As a first example of this second set of embodiments, a single MAC CE may be used to identify one or more candidate beams. In this case, the MAC CE may include information regarding whether a candidate beam identified by the MAC CE is an UL candidate beam, a DL candidate beam, or a candidate beam for both UL and DL. Further, the MAC CE may include other information such as whether an octet of the MAC CE identifies a candidate beam, a serving cell index corresponding to a candidate beam, and/or an index for a candidate beam.

Figure 3:
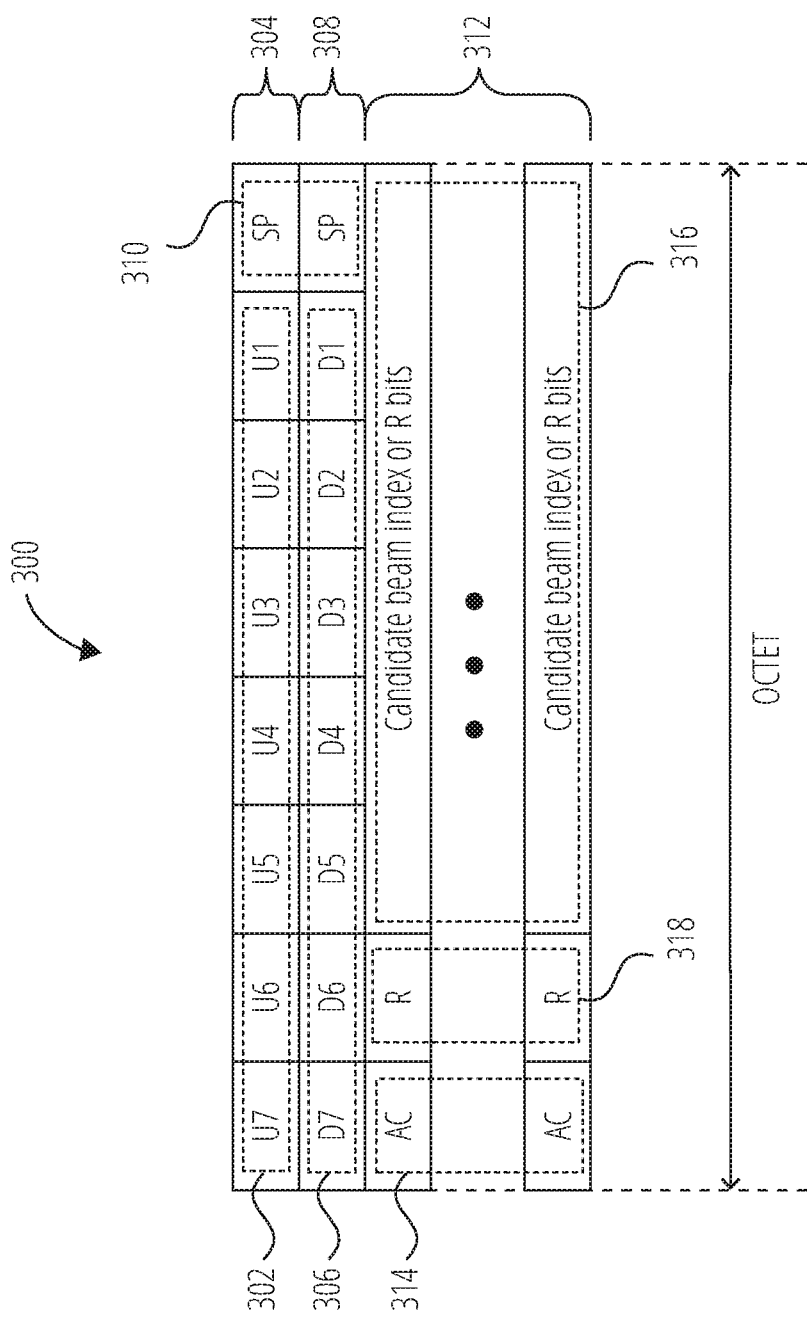
FIG. 3 illustrates a MAC CE used to identify one or more candidate beams.

FIG. 3 illustrates a MAC CE 300 used to identify one or more candidate beams. The MAC CE 300 may be used to identify one or more candidate beams regardless of whether the candidate beam is an UL candidate beam, a DL candidate beam, or a candidate beam for both UL and DL, as discussed above. In this first example, the MAC CE 300 may be formatted with a plurality of $U_j$ bits 302 in a first octet 304, one for each of serving cells j, where a value 1 indicates that the serving cell fails on UL (e.g., that the serving cell j has experienced UL beam failure) and a value 0 indicates that the serving cell does not fail on UL (e.g., that the serving cell j has not experienced UL failure). The MAC CE may be further formatted with a plurality of $D_j$ bits 306 in a second octet 308, one for each of the serving cells j, where a value 1 indicates that the serving cell fails on the DL (e.g., that the serving cell j has experienced DL beam failure) and a value 0 indicates that the serving cell does not fail on DL (e.g., that the serving cell j has not experienced DL beam failure).

The MAC CE 300 may be further formatted with one or more SP bits 310 that indicate whether the corresponding ($U_j/D_j$ information (e.g., in the same octet) is for a special cell (spCell) or a secondary cell (SCell) of the relevant cell group. In some embodiments (like the one shown in FIG. 3), these may be found in, respectively, the first octet 304 and the second octet 308 having the corresponding $U_j/D_j$ values, as illustrated. In other cases (not shown), a single SP bit may be used that applies to the both the $U_j$ and $D_j$ information in a MAC CE (and any remaining spaces in the MAC CE associated with, e.g., the SP bits 310 in the alternative MAC CE 300 may be filled with, for example, reserved bits or by additional $U_j/D_j$ bit(s)). In other alternative cases, a MAC CE may not include the SP bits 310 (e.g., these may be totally replaced by reserved bits or by additional $U_j/D_j$ bit(s), as appropriate). Such a MAC CE may be understood to indicate beam failures for both spCell and SCell.

The MAC CE 300 further contains additional octets 312, with each one of the additional octets 312 corresponding to one of the serving cells represented in the $U_j$ bits 302 and the $D_j$ bits 306. Each of these additional octets 312 may be formatted with a bit 314 that indicates whether the respective octet identifies a candidate beam for use by that octet's corresponding serving cell. If yes, the index of the candidate beam that identifies that candidate beam may be placed in the candidate beam index field 316 for that octet. If no, the candidate beam index field 316 for that octet may simply be reserved (carry reserve bits). Each octet may further include one or more R bit(s) 318 (for a reserved bit field), which may promote octet alignment within the MAC CE 300.

As a second example of this second set of embodiments BFRQ using MAC CE resources to identify one or more candidate beams, multiple MAC CE may be used to identify candidate beams. A first MAC CE can be used for identifying UL candidate beams, and a second MAC CE can be used for identifying DL candidate beams. Each of these MAC CE may further include other information such as whether a given octet of the MAC CE identifies a candidate beam, a serving cell index corresponding to a candidate beam, and/or an index for a candidate beam. In cases where a candidate beam is a candidate beam for both UL and DL, this may be communicated to the base station by identifying the candidate beam using both the first MAC CE and the second MAC CE.

This second set of embodiments may modify the use of an existing MAC CE within the wireless communication system for this purpose. For example, wireless communication systems using MAC CE as described in 3GPP TS 38.321, "Medium Access Control (MAC) protocol specification (Release 16)," version 16.4.0 (March 2021), section 6.1.3.23 may have such MAC CE modified to be used to (separately) indicate UL candidate beams and DL candidate beams. In such cases, new particular logical channel identifiers (LCID) of a medium access control (MAC) header for such MAC CE may be used, where one such LCID is used to indicate that a first such MAC CE is for recovery from UL beam failure (e.g., that the MAC CE indicates UL candidate beam(s)), and another such LCID is used to indicate that a second such MAC CE is for recovery from DL beam failure (e.g., the MAC CE indicates DL candidate beam(s)). Alternatively or additionally, these MAC CE may be themselves modified to include a 2-bit indicator that can indicate whether the MAC CE is for recovery from UL beam failure, recovery from DL beam failure, or for recovery for beam failure in UL and DL (e.g., the MAC CE indicates candidate beam(s) for UL and DL).

In BFRQ that use MAC CE, such as those discussed herein, it may be that the MAC CE is sent using resources granted to a UE by a base station in response to one or more dedicated scheduling request(s) made by the UE to the base station. These scheduling request(s) may be configured by RRC (e.g., during the RRC configuration 206).

In a first option, a single scheduling request may be configured such that the UE triggers this scheduling request when either of an UL beam failure or a DL beam failure (or both) occurs.

In a second option, two scheduling requests may be configured. In this instance, the UE may trigger a first of the two scheduling requests when an UL beam failure occurs. Further, the UE may trigger a second of the two scheduling requests when a DL beam failure occurs. When both UL and DL beam failure occur simultaneously, a predefined one of the two scheduling requests may be triggered. The predefined one of the two scheduling requests may be according to, for example, configuration by the base station (e.g., during RRC configuration 206), or may be according to a specification with which the wireless communication system for the UE is compliant.

In BFRQ that use MAC CE, but which do not send the MAC CE according to resource provided in response to a dedicated scheduling request, the UE may instead use a contention based random access (CBRA) procedure to report the MAC CE. In these cases, when a 4-step CBRA is used, the MAC CE may be sent in Msg3. In other cases where a 2-step CBRA is used, the MAC CE may be sent in MsgA.

Returning to FIG. 2: The base station 204 replies to BFRQ 218 with a BFRR 220. The BFRR may confirm to the UE 202 that the base station 104 received the BFRQ 218 and has switched to the indicated candidate beam(s) in order to communicate data between the UE 102 and the base station 104. In the case that the BFRQ 218 used CF-PRACH resources (e.g., as described above), the BFRR 220 may be sent on a PDCCH that is transmitted in a dedicated search space (SS). In the case that the BFRQ 218 used MAC CE (e.g., as described above), the BFRR 220 may be sent on a PDCCH that triggers a new UL transmission and that has a same hybrid automatic repeat request (HARQ) process identifier (ID) as a physical uplink shared channel (PUSCH) used to send the MAC CE.

Once the UE receives the BFRR 220, the UE may apply 222 the candidate beam(s) previously identified for use for receiving PDCCH and for sending PUCCH. This application 222 may take the form of the UE determining UE beam(s) (each aligned to one of the identified candidate beam(s)) for use to communicate data between the base station 204 (as appropriate in the case of UL candidate beams vs DL candidate beams vs candidate beams for both UL and DL). The application 222 may occur after a number of symbols K after the receipt of the BFRR 220, such that there is time for the UE to decode the BFRR 220 prior to the time of the switch to the new beam(s) as between the UE 202 and the base station 204. In some embodiments, K may be 28, which may be consistent with a specification for the wireless communication system for the UE 102 and the base station 104.

In cases where the BFRQ 218 corresponds to a UL beam failure (e.g., where the BFRQ 218 accordingly indicates one or more UL candidate beam(s) for recovering from the UL beam failure), the UE may apply one or more UL channels (e.g., PUCCH, PUSCH, and/or SRS) for use on one (or more) of these UL candidate beam(s). In this case, default or preconfigured power control parameters can be applied for the uplink channels. Further, pathloss values used for calculating power control should themselves be calculated based on the L1-RSRP or the L3-RSRP of the reference signal(s) on the UL candidate beam(s) (e.g., as measured during the UL/DL CBD portion of the UL/DL BFD/CBD 210). It is contemplated that in some embodiments any reported candidate beams for UL and DL may be similarly used/treated to recover from the UL beam failure.

In cases where the BFRQ 218 corresponds to a DL beam failure (e.g., where the BFRQ 218 accordingly indicates one or more DL candidate beam(s) for recovering from the DL beam failure), the UE may apply one or more DL channels (e.g., PDCCH, physical downlink shared channel (PDSCH), and/or CSI-RS) for use on one (or more) of these DL candidate beam(s). A CSI-RS that is applied to a DL candidate beam may depend on the time domain behavior of that CSI-RS (e.g., depend on whether the CSI-RS is periodic, semi-persistent, or aperiodic CSI-RS) and/or may depend on the usage of the CSI-RS (e.g., depend on whether the CSI-RS is used for channel state information (CSI), tracking, and/or beam management). It is contemplated that in some embodiments any reported candidate beams for UL and DL may be similarly used/treated to recover from the DL beam failure.

In cases where the BFRQ 218 corresponds to both UL and DL beam failure (e.g., where the BFRQ 218 accordingly indicated one or more UL candidate beam(s) for recovering from the UL beam failure and one or more DL candidate beam(s) for recovering from the DL beam failure, and/or where the BFRQ 218 indicated one or more candidate beams for UL and DL to recover from a beam failure for UL and DL), the UE may apply any one or more UL channels (e.g., PUCCH, PUSCH, and/or SRS) for use on (or more) of any UL candidate beams and/or any candidate beams for UL and DL. In this case, default or preconfigured power control parameters can be applied for the uplink channels. Further, pathloss values used for calculating power control should themselves be calculated based on the L1-RSRP or the L3-RSRP of the reference signal(s) on the UL candidate beam(s)/candidate beam(s) for UL and DL (e.g., as measured during the UL/DL CBD portion of the UL/DL BFD/CBD 210). Further, the UE may apply any one or more DL channels (e.g., PDCCH, PDSCH, and/or CSI/RS) for use on one (or more) of any DL candidate beams and/or any candidate beams for UL and DL. A CSI-RS that is applied to a DL candidate beam/candidate beam for UL and DL may depend on the time domain behavior of that CSI-RS (e.g., depend on whether the CSI-RS is periodic, semi-persistent, or aperiodic CSI-RS) and/or may depend on the usage of the CSI-RS (e.g., depend on whether the CSI-RS is used for channel state information (CSI), tracking, and/or beam management).

Figure 4:
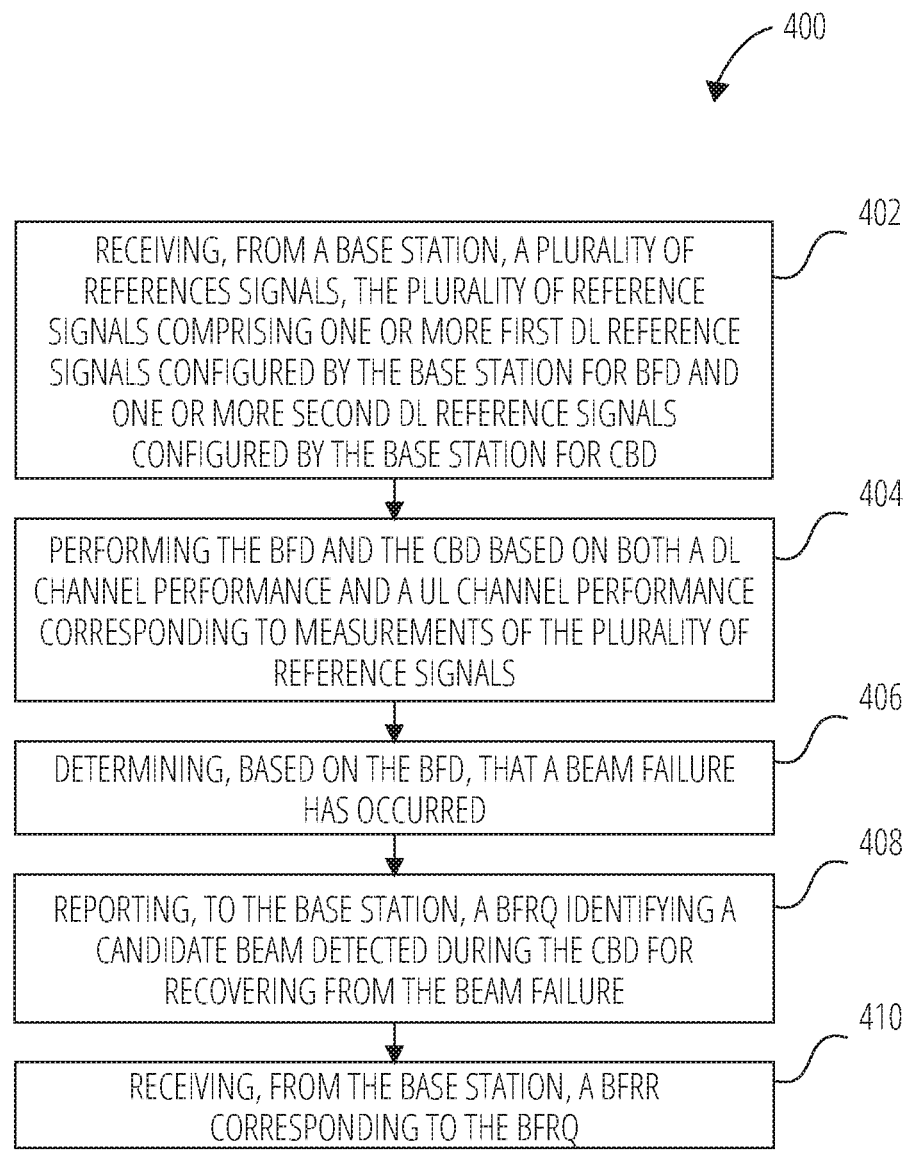
FIG. 4 illustrates a method in accordance with one embodiment.

FIG. 4 illustrates a method of a UE, according to an embodiment. The method 400 includes receiving 402, from a base station, a plurality of references signals, the plurality of reference signals comprising one or more first DL reference signals configured by the base station for BFD and one or more second DL reference signals configured by the base station for CBD.

The method 400 further includes performing 404, the BFD and the CBD based on both a DL channel performance and a UL channel performance corresponding to measurements of the plurality of reference signals.

The method 400 further includes determining 406, based on the BFD, that a beam failure has occurred.

The method 400 further includes reporting 408, to the base station, a BFRQ identifying a candidate beam detected during the CBD for recovering from the beam failure.

The method 400 further includes receiving 410, from the base station, a BFRR corresponding to the BFRQ.

In some embodiments of the method 400, the BFD is performed based on a comparison of measured L1-RSRP of the one or more first DL reference signals to an L1-RSRP threshold. In some of these cases, the BFD is further performed based on a comparison of hypothetical BLER calculated respective to the one or more first DL reference signals to a hypothetical BLER threshold.

In some embodiments of the method 400, the BFD is performed based on a comparison of virtual PHR measured respective to the one or more first DL reference signals to a virtual PHR threshold. In some of these cases, the BFD is further performed based on a comparison of hypothetical BLER calculated respective to the one or more first DL reference signals to a hypothetical BLER threshold.

In some embodiments of the method 400, performing the BFD comprises performing UL BFD and performing DL BFD; the UL BFD is performed based on a first comparison; and the DL BFD is performed based on a second comparison. In some of these cases, the first comparison comprises a comparison of measured L1-RSRP of the one or more first DL reference signals to a first L1-RSRP threshold; and the second comparison comprises a comparison of the measured L1-RSRP of the one or more first DL reference signals to a second RSRP threshold. In some of these cases, the first comparison comprises a comparison of measured L1-RSRP of the one or more first DL reference signals to an L1-RSRP threshold; and the second comparison comprises a comparison of hypothetical BLER calculated respective to the one or more first DL reference signals to a hypothetical BLER threshold. In some of these cases, the first comparison comprises a comparison of virtual PHR measured respective to the one or more first DL reference signals to a virtual PHR threshold; and the second comparison comprises a comparison of hypothetical BLER calculated respective to the one or more first DL reference signals to a hypothetical BLER threshold.

In some embodiments of the method 400, the CBD is performed based on a comparison of measured L1-RSRP of the one or more second DL reference signals to an L1-RSRP threshold.

In some embodiments of the method 400, performing the CBD comprises performing UL CBD and performing DL CBD; the UL CBD is performed based on a first comparison; and the DL CBD is performed based on a second comparison. In some of these cases, the first comparison comprises a comparison of measured L1-RSRP of the one or more second DL reference signals to a first L1-RSRP threshold; and the second comparison comprises a comparison of the measured L1-RSRP of the one or more second DL reference signals to a second RSRP threshold. In some of these cases, the first comparison comprises a comparison of virtual PHR measured respective to the one or more second DL reference signals to a virtual PHR threshold; and the second comparison comprises a comparison of measured L1-RSRP of the one or more second DL reference signals to an L1-RSRP threshold.

In some embodiments of the method 400, the BFRQ uses a CF-PRACH resource to identify the candidate beam; and the CF-PRACH resource used to identify the candidate beam corresponds to one of a use of the candidate beam as one of an UL candidate beam, a DL candidate beam, and a candidate beam for both UL and DL.

In some embodiments of the method 400, the BFRQ uses a MAC CE to identify the candidate beam. In some of these embodiments, the MAC CE comprises one or more indications corresponding to a use of the candidate beam as one or more of an UL candidate beam and a DL candidate beam on a serving cell. In some of these embodiments, the MAC CE corresponds to the use of the candidate beam as one of an UL candidate beam and a DL candidate beam. In some of these embodiments, the MAC CE is sent on resources granted by the base station in response to a scheduling request that is configured to be sent by the UE in response to the BFD. In some of these embodiments, the beam failure comprises an UL beam failure; and the MAC CE is sent on resources granted to the UE by the base station in response to a scheduling request that is configured to be sent by the UE in response to the UL beam failure. In some of these embodiments, the beam failure comprises a DL beam failure; and the MAC CE is sent on resources granted to the UE by the base station in response to a scheduling request that is configured to be sent by the UE in response to the DL beam failure. In some of these embodiments, the MAC CE is sent on resources acquired by the UE using a contention based random access (CBRA) procedure.

In some embodiments of the method 400, the BFRQ is reported using CF-PRACH resources; and the BFRR is received in a PDCCH transmitted in a dedicated SS for the UE.

In some embodiments of the method 400, the BFRQ is reported to the base station using a MAC CE in a PUSCH; and the BFRR is received in a PDCCH with a same HARQ process ID as the PUSCH.

In some embodiments of the method 400, the candidate beam is to be used for UL; and the method 400 further comprises: applying, at the UE, one or more UL channels for use on the candidate beam; and determining a pathloss metric to be used in a power control calculation for the one or more UL channels based on a DL reference signal of the candidate beam.

In some embodiments of the method 400, the candidate beam is to be used for DL; and the method 400 further comprises: applying, at the UE, one or more DL channels for use on the candidate beam.

Embodiments contemplated herein include an apparatus comprising means to perform one or more elements of the method 400. This apparatus may be, for example, an apparatus of a UE (such as a wireless device 702 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 706 of a wireless device 702 that is a UE, as described herein).

Embodiments contemplated herein include an apparatus comprising logic, modules, or circuitry to perform one or more elements of the method 400. This apparatus may be, for example, an apparatus of a UE (such as a wireless device 702 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 702 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 704 of a wireless device 702 that is a UE, as described herein). These instructions may be, for example, located in the processor and/or on a memory of the UE (such as a memory 706 of a wireless device 702 that is a UE, as described herein).

Figure 5:
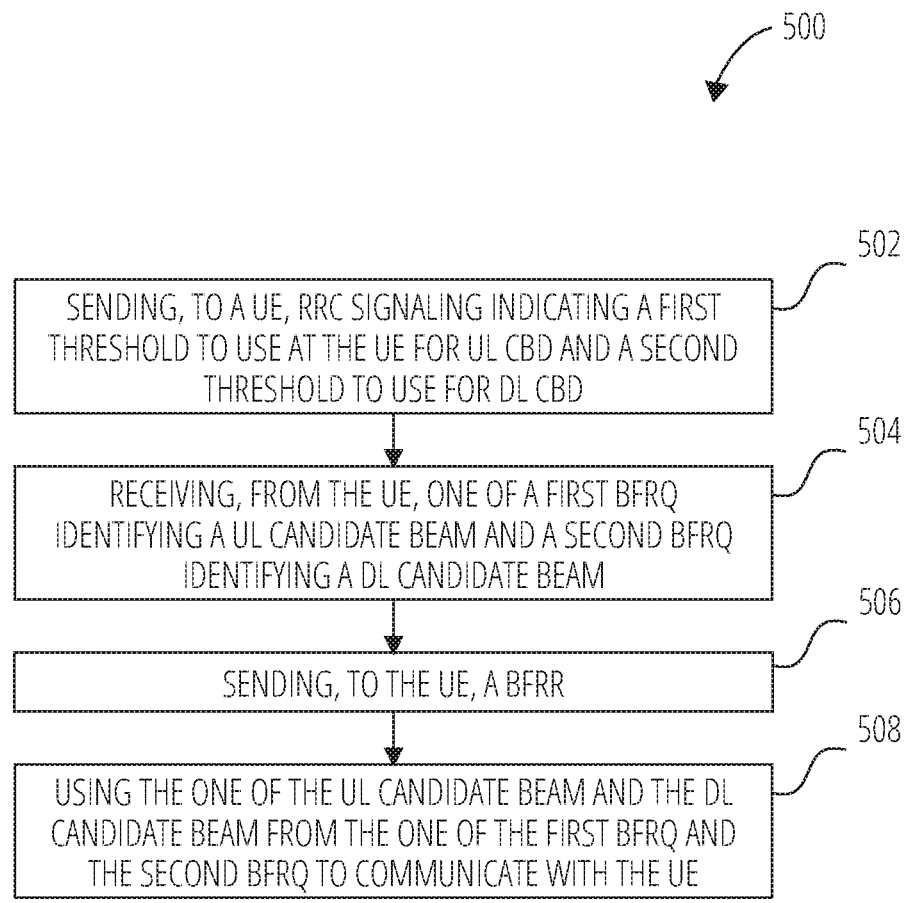
FIG. 5 illustrates a method in accordance with one embodiment.

FIG. 5 illustrates a method of a base station, according to an embodiment. The method 500 includes sending 502, to a UE, RRC signaling indicating a first threshold to use at the UE for UL CBD and a second threshold to use for DL CBD.

The method 500 further includes receiving 504, from the UE, one of a first BFRQ identifying a UL candidate beam and a second BFRQ identifying a DL candidate beam.

The method 500 further includes sending, to the UE, a BFRR.

The method 500 further includes using 508 the one of the UL candidate beam and the DL candidate beam from the one of the first BFRQ and the second BFRQ to communicate with the UE.

In some embodiments of the method 500, the UL candidate beam is not used for DL communications with the UE and the DL candidate beam is not used for UL communications with the UE.

In some embodiments of the method 500, each of the first threshold and the second threshold is one of a L1-RSRP threshold and a virtual PHR threshold.

In some embodiments of the method 500, the RRC signaling further indicates a third threshold to use at the UE for UL BFD and a fourth threshold to use for DL BFD.

In some embodiments of the method 500, each of the third threshold and the fourth threshold is one of a L1-RSRP threshold, a hypothetical BLER threshold, and a virtual PHR threshold.

In some embodiments of the method 500, the RRC signaling further indicates: a first CF-PRACH resource used by the base station to receive the first BFRQ; and a second CF-PRACH resource used by the base station to receive the second BFRQ.

In some embodiments of the method 500, the RRC signaling further indicates a first configuration for a first scheduling request to be used by the UE to schedule a first MAC CE used by the base station to receive the first BFRQ; and a second configuration for a second scheduling request to be used by the UE to schedule a second MAC CE used by the base station to receive the second BFRQ.

In some embodiments of the method 500, the BFRR is sent to the UE in one of: a dedicated SS for the UE; and a PDCCH with a same HARQ process ID used by a medium access control control element MAC CE of the one of the first BFRQ and the second BFRQ.

Embodiments contemplated herein include an apparatus comprising means to perform one or more elements of the method 500. This apparatus may be, for example, an apparatus of a base station (such as a network device 718 that is a base station, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a base station (such as a memory 722 of a network device 718 that is a base station, as described herein).

Embodiments contemplated herein include an apparatus comprising logic, modules, or circuitry to perform one or more elements of the method 500. This apparatus may be, for example, an apparatus of a base station (such as a network device 718 that is a base station, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a base station (such as a network device 718 that is a base station, as described herein).

Embodiments contemplated herein include a signal as described in or related to one or more elements of the method 500.

Embodiments contemplated herein include a computer program or computer program product comprising instructions, wherein execution of the program by a processing element is to cause the processing element to carry out one or more elements of the method 500. The processor may be a processor of a base station (such as a processor(s) 720 of a network device 718 that is a base station, as described herein). These instructions may be, for example, located in the processor and/or on a memory of the base station (such as a memory 722 of a network device 718 that is a base station, as described herein).

Figure 6:
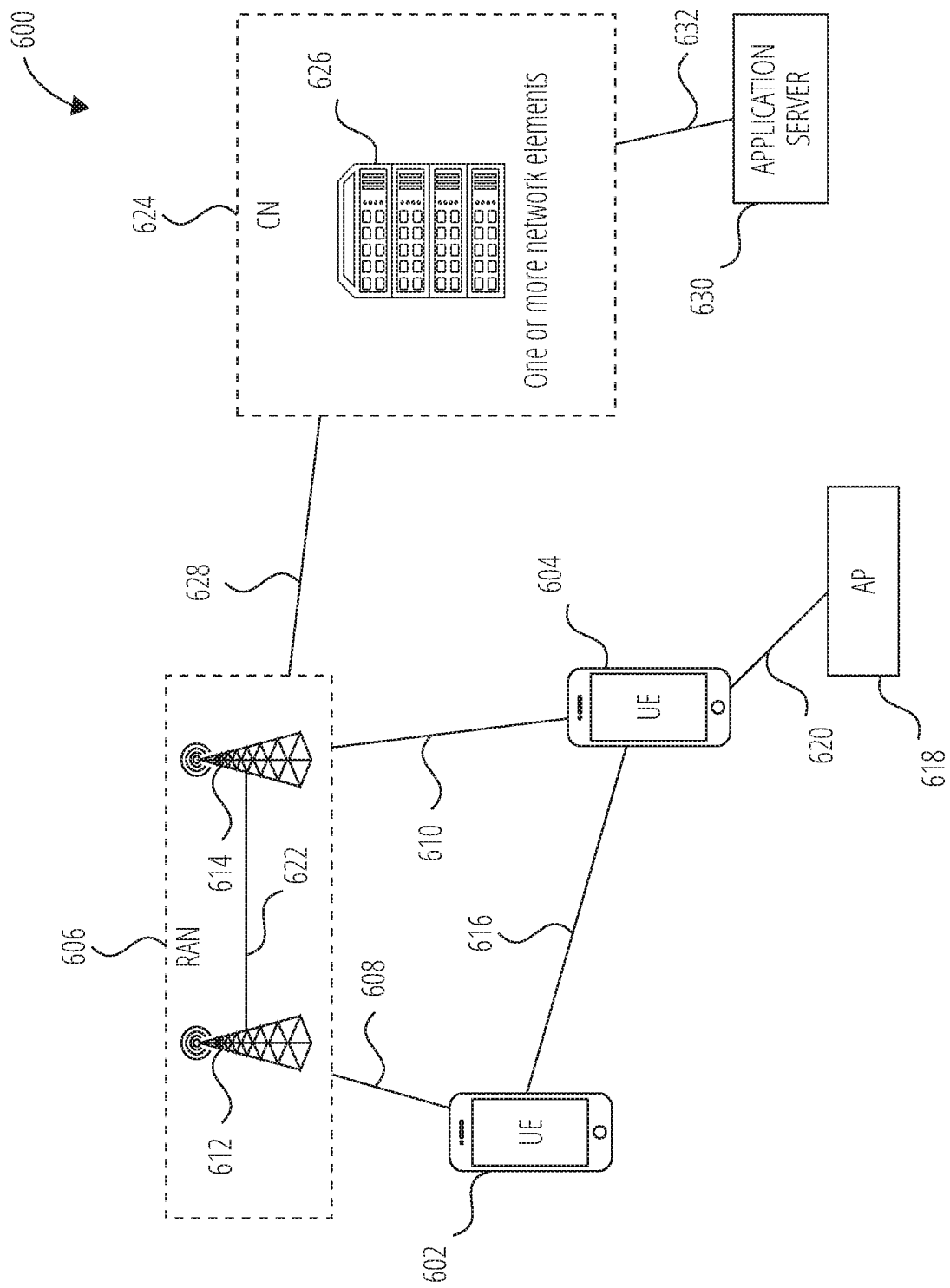
FIG. 6 illustrates an example architecture of a wireless communication system, according to embodiments disclosed herein.

FIG. 6 illustrates an example architecture of a wireless communication system 600, according to embodiments disclosed herein. The following description is provided for an example wireless communication system 600 that operates in conjunction with the LTE system standards and/or 5G or NR system standards as provided by 3GPP technical specifications.

As shown by FIG. 6, the wireless communication system 600 includes UE 602 and UE 604 (although any number of UEs may be used). In this example, the UE 602 and the UE 604 are illustrated as smartphones (e.g., handheld touchscreen mobile computing devices connectable to one or more cellular networks), but may also comprise any mobile or non-mobile computing device configured for wireless communication.

The UE 602 and UE 604 may be configured to communicatively couple with a RAN 606. In embodiments, the RAN 606 may be NG-RAN, E-UTRAN, etc. The UE 602 and UE 604 utilize connections (or channels) (shown as connection 608 and connection 610, respectively) with the RAN 606, each of which comprises a physical communications interface. The RAN 606 can include one or more base stations, such as base station 612 and base station 614, that enable the connection 608 and connection 610.

In this example, the connection 608 and connection 610 are air interfaces to enable such communicative coupling, and may be consistent with RAT(s) used by the RAN 606, such as, for example, an LTE and/or NR.

In some embodiments, the UE 602 and UE 604 may also directly exchange communication data via a sidelink interface 616. The UE 604 is shown to be configured to access an access point (shown as AP 618) via connection 620. By way of example, the connection 620 can comprise a local wireless connection, such as a connection consistent with any IEEE 802.11 protocol, wherein the AP 618 may comprise a Wi-Fi® router. In this example, the AP 618 may be connected to another network (for example, the Internet) without going through a CN 624.

In embodiments, the UE 602 and UE 604 can be configured to communicate using orthogonal frequency division multiplexing (OFDM) communication signals with each other or with the base station 612 and/or the base station 614 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 612 or base station 614 may be implemented as one or more software entities running on server computers as part of a virtual network. In addition, or in other embodiments, the base station 612 or base station 614 may be configured to communicate with one another via interface 622. In embodiments where the wireless communication system 600 is an LTE system (e.g., when the CN 624 is an EPC), the interface 622 may be an X2 interface. The X2 interface may be defined between two or more base stations (e.g., two or more eNBs and the like) that connect to an EPC, and/or between two eNBs connecting to the EPC. In embodiments where the wireless communication system 600 is an NR system (e.g., when CN 624 is a 5GC), the interface 622 may be an Xn interface. The Xn interface is defined between two or more base stations (e.g., two or more gNBs and the like) that connect to 5GC, between a base station 612 (e.g., a gNB) connecting to 5GC and an eNB, and/or between two eNBs connecting to 5GC (e.g., CN 624).

The RAN 606 is shown to be communicatively coupled to the CN 624. The CN 624 may comprise one or more network elements 626, which are configured to offer various data and telecommunications services to customers/subscribers (e.g., users of UE 602 and UE 604) who are connected to the CN 624 via the RAN 606. The components of the CN 624 may be implemented in one physical device or separate physical devices including components to read and execute instructions from a machine-readable or computer-readable medium (e.g., a non-transitory machine-readable storage medium).

In embodiments, the CN 624 may be an EPC, and the RAN 606 may be connected with the CN 624 via an S1 interface 628. In embodiments, the S1 interface 628 may be split into two parts, an S1 user plane (S 1-U) interface, which carries traffic data between the base station 612 or base station 614 and a serving gateway (S-GW), and the S1-MME interface, which is a signaling interface between the base station 612 or base station 614 and mobility management entities (MMEs).

In embodiments, the CN 624 may be a 5GC, and the RAN 606 may be connected with the CN 624 via an NG interface 628. In embodiments, the NG interface 628 may be split into two parts, an NG user plane (NG-U) interface, which carries traffic data between the base station 612 or base station 614 and a user plane function (UPF), and the S1 control plane (NG-C) interface, which is a signaling interface between the base station 612 or base station 614 and access and mobility management functions (AMFs).

Generally, an application server 630 may be an element offering applications that use internet protocol (IP) bearer resources with the CN 624 (e.g., packet switched data services). The application server 630 can also be configured to support one or more communication services (e.g., VoIP sessions, group communication sessions, etc.) for the UE 602 and UE 604 via the CN 624. The application server 630 may communicate with the CN 624 through an IP communications interface 632.

Figure 7:
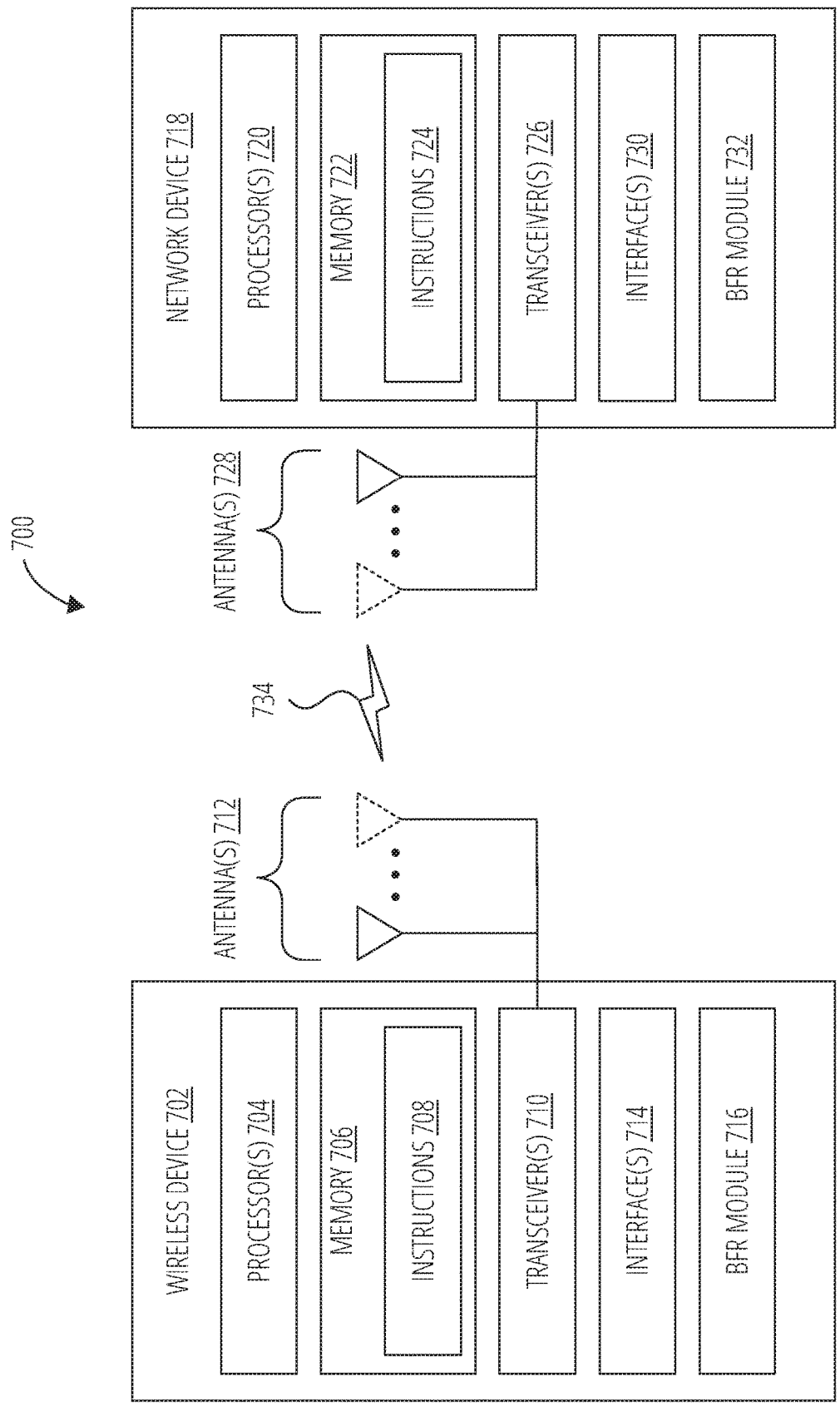
FIG. 7 illustrates a system for performing signaling between a wireless device and a network device, according to embodiments disclosed herein.

FIG. 7 illustrates a system 700 for performing signaling 734 between a wireless device 702 and a network device 718, according to embodiments disclosed herein. The system 700 may be a portion of a wireless communications system as herein described. The wireless device 702 may be, for example, a UE of a wireless communication system. The network device 718 may be, for example, a base station (e.g., an eNB or a gNB) of a wireless communication system.

The wireless device 702 may include one or more processor(s) 704. The processor(s) 704 may execute instructions such that various operations of the wireless device 702 are performed, as described herein. The processor(s) 704 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 702 may include a memory 706. The memory 706 may be a non-transitory computer-readable storage medium that stores instructions 708 (which may include, for example, the instructions being executed by the processor(s) 704). The instructions 708 may also be referred to as program code or a computer program. The memory 706 may also store data used by, and results computed by, the processor(s) 704.

The wireless device 702 may include one or more transceiver(s) 710 that may include radio frequency (RF) transmitter and/or receiver circuitry that use the antenna(s) 712 of the wireless device 702 to facilitate signaling (e.g., the signaling 734) to and/or from the wireless device 702 with other devices (e.g., the network device 718) according to corresponding RATs.

The wireless device 702 may include one or more antenna(s) 712 (e.g., one, two, four, or more). For embodiments with multiple antenna(s) 712, the wireless device 702 may leverage the spatial diversity of such multiple antenna(s) 712 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 702 may be accomplished according to precoding (or digital beamforming) that is applied at the wireless device 702 that multiplexes the data streams across the antenna(s) 712 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 702 may implement analog beamforming techniques, whereby phases of the signals sent by the antenna(s) 712 are relatively adjusted such that the (joint) transmission of the antenna(s) 712 can be directed (this is sometimes referred to as beam steering).

The wireless device 702 may include one or more interface(s) 714. The interface(s) 714 may be used to provide input to or output from the wireless device 702. For example, a wireless device 702 that is a UE may include interface(s) 714 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 710/antenna(s) 712 already described) that allow for communication between the UE and other devices and may operate according to known protocols (e.g., Wi-Fi®, Bluetooth °, and the like).

The wireless device 702 may include a BFR module 716. The BFR module 716 may be implemented via hardware, software, or combinations thereof. For example, the BFR module 716 may be implemented as a processor, circuit, and/or instructions 708 stored in the memory 706 and executed by the processor(s) 704. In some examples, the BFR module 716 may be integrated within the processor(s) 704 and/or the transceiver(s) 710. For example, the BFR module 716 may be implemented by a combination of software components (e.g., executed by a DSP or a general processor) and hardware components (e.g., logic gates and circuitry) within the processor(s) 704 or the transceiver(s) 710.

The BFR module 716 may be used for various aspects of the present disclosure, for example, aspects of FIG. 1 through FIG. 5. The BFR module 716 is configured to, for example, process configuration for BFR as received from another device (e.g., the network device 718), perform BFD as described herein, perform CBD as described herein, generate a BFRQ to send to another device (e.g., the network device 718), and/or to process a BFRR from another device (e.g., the network device 718).

The network device 718 may include one or more processor(s) 720. The processor(s) 720 may execute instructions such that various operations of the network device 718 are performed, as described herein. The processor(s) 704 may include one or more baseband processors implemented using, for example, a CPU, a DSP, an ASIC, a controller, an FPGA device, another hardware device, a firmware device, or any combination thereof configured to perform the operations described herein.

The network device 718 may include a memory 722. The memory 722 may be a non-transitory computer-readable storage medium that stores instructions 724 (which may include, for example, the instructions being executed by the processor(s) 720). The instructions 724 may also be referred to as program code or a computer program. The memory 722 may also store data used by, and results computed by, the processor(s) 720.

The network device 718 may include one or more transceiver(s) 726 that may include RF transmitter and/or receiver circuitry that use the antenna(s) 728 of the network device 718 to facilitate signaling (e.g., the signaling 734) to and/or from the network device 718 with other devices (e.g., the wireless device 702) according to corresponding RATs.

The network device 718 may include one or more antenna(s) 728 (e.g., one, two, four, or more). In embodiments having multiple antenna(s) 728, the network device 718 may perform MIMO, digital beamforming, analog beamforming, beam steering, etc., as has been described.

The network device 718 may include one or more interface(s) 730. The interface(s) 730 may be used to provide input to or output from the network device 718. For example, a network device 718 that is a base station may include interface(s) 730 made up of transmitters, receivers, and other circuitry (e.g., other than the transceiver(s) 726/ antenna(s) 728 already described) that enables the base station to communicate with other equipment in a core network, and/or that enables the base station to communicate with external networks, computers, databases, and the like for purposes of operations, administration, and maintenance of the base station or other equipment operably connected thereto.

The network device 718 may include a BFR module 732. The BFR module 732 may be implemented via hardware, software, or combinations thereof. For example, the BFR module 732 may be implemented as a processor, circuit, and/or instructions 724 stored in the memory 722 and executed by the processor(s) 720. In some examples, the BFR module 732 may be integrated within the processor(s) 720 and/or the transceiver(s) 726. For example, the BFR module 732 may be implemented by a combination of software components (e.g., executed by a DSP or a general processor) and hardware components (e.g., logic gates and circuitry) within the processor(s) 720 or the transceiver(s) 726.

The BFR module 732 may be used for various aspects of the present disclosure, for example, aspects of FIG. 1 through FIG. 5. The BFR module 732 is configured to for example, configure another device (e.g., the wireless device 702) to use BFD and/or CBD as described herein, configure another device (e.g., the wireless device 702) to send BFRQ as described herein, and/or to send BFRR to another device (e.g., the wireless device 702) in the manner described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
   receiving, from a base station, a plurality of reference signals, the plurality of reference signals comprising one or more first downlink (DL) reference signals configured by the base station for beam failure detection (BFD) and one or more second DL reference signals configured by the base station for candidate beam detection (CBD);
   performing the BFD and the CBD based on both a DL channel performance and an uplink (UL) channel performance corresponding to measurements of the plurality of reference signals;
   determining, based on the BFD, that a beam failure has occurred; and
   reporting, to the base station, a beam failure recovery request (BFRQ) identifying a candidate beam detected during the CBD for recovering from the beam failure, wherein the BFRQ uses a medium access control control element (MAC CE) to identify the candidate beam, wherein the MAC CE indicates that the candidate beam is to be used as both an UL candidate beam and a DL candidate beam on a serving cell, and wherein the MAC CE comprises a first bit that indicates whether the serving cell has experienced an UL beam failure and a second bit that indicates whether the serving cell has experienced a DL beam failure.

2. The method of claim 1, wherein:
the BFD is performed based on a comparison of measured layer 1 reference signal received power (L1-RSRP) of the one or more first DL reference signals to an L1-RSRP threshold.

3. The method of claim 2, wherein:
the BFD is further performed based on a comparison of hypothetical block error ratio (BLER) calculated respective to the one or more first DL reference signals to a hypothetical BLER threshold.

4. The method of claim 1, wherein:
the BFD is performed based on a comparison of virtual power headroom (PHR) measured respective to the one or more first DL reference signals to a virtual PHR threshold.

5. The method of claim 4, wherein:
the BFD is further performed based on a comparison of hypothetical block error ratio (BLER) calculated respective to the one or more first DL reference signals to a hypothetical BLER threshold.

6. The method of claim 1, wherein:
performing the BFD comprises performing UL BFD and performing DL BFD;
the UL BFD is performed based on a first comparison; and
the DL BFD is performed based on a second comparison.

7. The method of claim 6, wherein:
the first comparison comprises a comparison of measured layer 1 reference signal received power (L1-RSRP) of the one or more first DL reference signals to a first L1-RSRP threshold; and
the second comparison comprises a comparison of the measured L1-RSRP of the one or more first DL reference signals to a second RSRP threshold.

8. The method of claim 6, wherein:
the first comparison comprises a comparison of measured layer 1 reference signal received power (L1-RSRP) of the one or more first DL reference signals to an L1-RSRP threshold; and
the second comparison comprises a comparison of hypothetical block error ratio (BLER) calculated respective to the one or more first DL reference signals to a hypothetical BLER threshold.

9. The method of claim 6, wherein:
the first comparison comprises a comparison of virtual power headroom (PHR) measured respective to the one or more first DL reference signals to a virtual PHR threshold; and the second comparison comprises a comparison of hypothetical block error ratio (BLER) calculated respective to the one or more first DL reference signals to a hypothetical BLER threshold.

10. The method of claim 1, wherein:
the CBD is performed based on a comparison of measured layer 1 reference signal received power (L1-RSRP) of the one or more second DL reference signals to an L1-RSRP threshold.

11. The method of claim 1, wherein:
performing the CBD comprises performing UL CBD and performing DL CBD;
the UL CBD is performed based on a first comparison; and
the DL CBD is performed based on a second comparison.

12. The method of claim 11, wherein:
the first comparison comprises a comparison of measured layer 1 reference signal received power (L1-RSRP) of the one or more second DL reference signals to a first L1-RSRP threshold; and
the second comparison comprises a comparison of the measured L1-RSRP of the one or more second DL reference signals to a second RSRP threshold.

13. The method of claim 11, wherein:
the first comparison comprises a comparison of virtual power headroom (PHR) measured respective to the one or more second DL reference signals to a virtual PHR threshold; and
the second comparison comprises a comparison of measured layer 1 reference signal received power (L1-RSRP) of the one or more second DL reference signals to an L1-RSRP threshold.

14. The method of claim 1, wherein:
the MAC CE is sent on resources granted by the base station in response to a scheduling request that is configured to be sent by the UE in response to the BFD.

15. The method of claim 1, wherein:
the beam failure comprises an UL beam failure; and
the MAC CE is sent on resources granted to the UE by the base station in response to a scheduling request that is configured to be sent by the UE in response to the UL beam failure.

16. The method of claim 1, wherein:
the beam failure comprises a DL beam failure; and
the MAC CE is sent on resources granted to the UE by the base station in response to a scheduling request that is configured to be sent by the UE in response to the DL beam failure.

* * * * *